United States Patent
Putzolu et al.

(10) Patent No.: US 7,626,927 B2
(45) Date of Patent: Dec. 1, 2009

(54) SYSTEM AND METHOD OF DATA TRANSMISSION IN WIRELESS COMMUNICATION NETWORKS

(75) Inventors: David M. Putzolu, Hillsboro, OR (US); Puneet Pandoh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 11/605,033

(22) Filed: Nov. 27, 2006

(65) Prior Publication Data

US 2008/0123518 A1 May 29, 2008

(51) Int. Cl.
*H04L 1/08* (2006.01)
(52) U.S. Cl. .................. 370/229; 370/241
(58) Field of Classification Search ........... 370/229, 370/230.1
See application file for complete search history.

(56) References Cited

U.S. PATENT DOCUMENTS

| | | | | |
|---|---|---|---|---|
| 6,567,388 B1 * | 5/2003 | Tomcik et al. | ............ | 370/335 |
| 6,760,860 B1 * | 7/2004 | Fong et al. | ............ | 714/4 |
| 7,164,654 B2 * | 1/2007 | Hunzinger et al. | .......... | 370/230 |
| 7,249,303 B2 * | 7/2007 | Dottling et al. | ............ | 714/748 |
| 7,251,218 B2 * | 7/2007 | Jorgensen | ............ | 370/235 |
| 2005/0276266 A1 * | 12/2005 | Terry | ............ | 370/394 |
| 2008/0031168 A1 * | 2/2008 | Bucknell et al. | ............ | 370/310 |

* cited by examiner

*Primary Examiner*—Lester Kincaid
*Assistant Examiner*—Isaak R Jama
(74) *Attorney, Agent, or Firm*—Cool Patent, P.C.; Joseph P. Curtin

(57) ABSTRACT

A system and method of data transmission in a wireless communication network are disclosed. The method comprises detecting an error in an original transmission and in response thereto, determining that latency sensitive data in the original transmission would be stale when transmitting a copy of the original transmission. The method further comprises transmitting the copy of the original transmission when a retransmission value function at least equals a predetermined threshold and transmitting a new transmission when the retransmission value function is less than the predetermined threshold. The new transmission comprises a copy of the data from the original transmission that is not stale when transmitting the new transmission.

19 Claims, 4 Drawing Sheets

SYSTEM AND METHOD OF DATA TRANSMISSION IN WIRELESS COMMUNICATION NETWORKS

FIELD OF THE INVENTION

The present invention relates generally to data transmission between wireless communication devices in wireless communication networks. In particular, the invention relates to improving data transmission in wireless communication networks where one or more errors in the transmission of data are detected.

BACKGROUND OF THE INVENTION

Due to the high probability of errors associated with wireless communication networks and systems, methods are employed for retransmitting data when a receiver detects an error in the transmitted data. One such method is an Automatic Repeat Request (ARQ), examples of which include stop-and-wait ARQs and selective repeat ARQs.

The Institute of Electrical and Electronics Engineers (IEEE) 802.16 standard, conformance and interoperability with which is promoted by the Worldwide Interoperability for Microwave Access (WiMAX) Forum, have adopted a standardized retransmission method known as Hybrid ARQ (HARQ) that is used in the Medium Access Control (MAC) layer. According to the HARQ method, when the receiver detects errors in a transmission, data from the original transmission is stored by the receiver and retransmission is requested. The receiver then combines the original transmission and one or more subsequently received copies of the original transmission to effectively increase the signal quality. There is a higher probability that one or more copies of the original transmission will be successfully decoded without errors than if the copy of the transmission had not been combined with the original transmission or the previously received copy. This is known as combining gain and is also employed in other retransmission methods to improve performance.

Each HARQ transmission may contain latency sensitive data, such as voice data packets and/or latency tolerant data packets, typically in the form of Service Data Units (SDUs). If the latency sensitive data is not successfully transmitted within a predetermined time, it is considered "stale" and may be discarded. In contrast, the latency tolerant data should be retransmitted until transmission is successful.

One drawback of retransmission methods including the HARQ method is that each retransmission adds latency. Detecting an error in the received transmission and requesting retransmission typically takes a minimum of 20 ms. Therefore, one retransmission will typically add another 20 ms or more to the total latency the data experiences and this latency problem is exacerbated with each retransmission required for successful transmission.

Hence, where both latency sensitive data and latency tolerant data are transmitted and an error is detected, the transmitter must determine whether it is worthwhile to retransmit an identical copy of the original transmission, thus taking advantage of combining gain from one or more previous retransmissions, or whether it should transmit an entirely new transmission, where the original latency sensitive data is omitted. Transmitting an entirely new transmission results in a smaller transmission, but all combining gain is lost because combining gain only works if identical transmissions are retransmitted. Currently, there are no well defined methods for determining when to transmit a copy of the original transmission and when to generate and send a new transmission.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1:
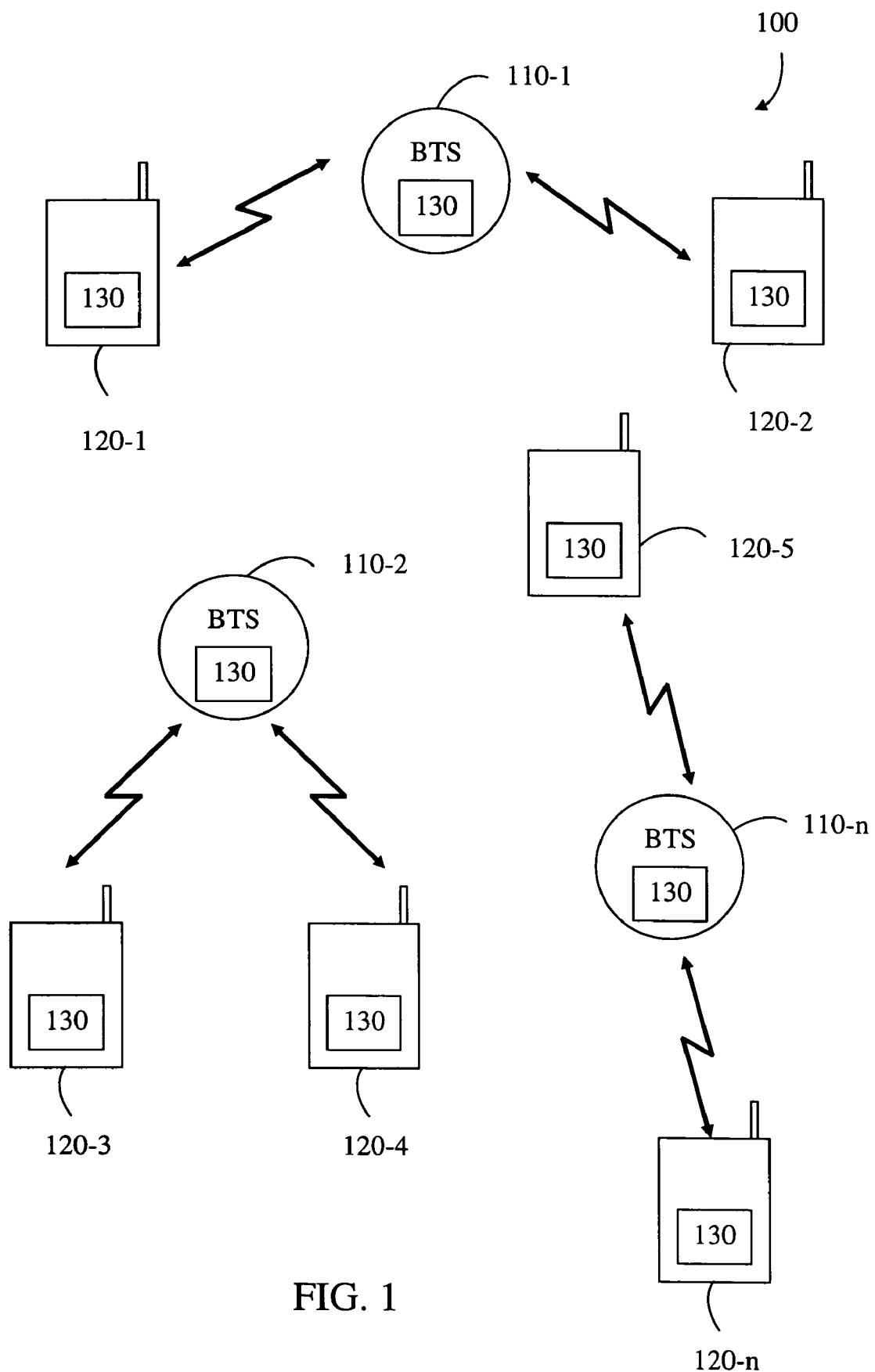
FIG. 1 is a schematic diagram illustrating a wireless communication network according to some embodiments of the present invention.

Skilled addressees will appreciate that elements in the figures are illustrated for simplicity and clarity and have not necessarily been drawn to scale. For example, the relative dimensions of some of the elements in the figures may be distorted to help improve understanding of embodiments of the present invention.

DETAILED DESCRIPTION

Before describing embodiments that are in accordance with the present invention in detail, it should be understood that the embodiments reside primarily in combinations of method steps and apparatus components related to data transmission and improving performance in a wireless communication network. Accordingly, the apparatus components and method steps have been represented where appropriate by conventional symbols in the drawings, showing only those specific details that are relevant to understanding the embodiments of the present invention such that the disclosure is not obscured with details that will be readily apparent to those of ordinary skill in the art.

In this specification, the terms "comprises," "comprising," "includes", "including" or any other variation thereof, are intended to cover a non-exclusive inclusion, such that a method, process, article or apparatus that comprises a list of elements does not include only those elements, but may include other elements not expressly listed or inherent to such method, process, article or apparatus. An element preceded by, for example, "comprises a . . . " does not, without more constraints, preclude the existence of additional identical elements in the method, process, article or apparatus that comprises the element.

It will be appreciated that embodiments of the invention herein described may be comprised of one or more conventional processors and unique stored program instructions that control the one or more processors to implement, in conjunction with certain non-processor circuits, some, most, or all of the functions of data transmission in a wireless communication network as herein described. The non-processor circuits may include, but are not limited to, a radio receiver, a radio transmitter, signal drivers, clock circuits, power source circuits, and user input devices. As such, these functions may be interpreted as a method of data transmission in a wireless communication network. Alternatively, some or all functions could be implemented by a state machine that has no stored program instructions, or in one or more application specific integrated circuits (ASICs), in which each function or one or more combinations of the functions are implemented as custom logic. A combination of the two approaches could also be used. Thus, methods and means for these functions have been described herein. Further, it is expected that one of ordinary skill in the art, when guided by the disclosure herein, will be readily capable of generating such software instructions, programs and integrated circuits with minimal experimentation.

With reference to FIG. 1 and in accordance with embodiments of the present invention, a schematic diagram illustrates a wireless communication network 100, which comprises one or more base transceiver stations (BTSs) 110-n (110-1, 110-2, ... 110-n). The BTSs 110-n can be in the form of, for example, pico BTSs, micro BTSs, macro BTSs or other form of BTS. Each BTS 110-n has one or more associated wireless communication devices 120-n (120-1, 120-2, ..., 120-n), such as mobile telephones, notebook computers, personal digital assistants (PDAs), or other wireless communication devices. As described in more detail below, each BTS 110-n and each wireless communication device 120-n comprises computer readable program code components 130 for data transmission in accordance with the teachings of the present invention.

The present invention provides a system and method of data transmission in the wireless communication network 100. The method comprises determining, in response to detecting an error in an original transmission, that latency sensitive data in the original transmission would be stale when transmitting a copy of the original transmission. The method further comprises transmitting the copy of the original transmission when a retransmission value function at least equals a predetermined threshold and transmitting a new transmission when the retransmission value function is less than the predetermined threshold. The new transmission comprises a copy of the data from the original transmission that is not stale when transmitting the new transmission.

Figure 2:
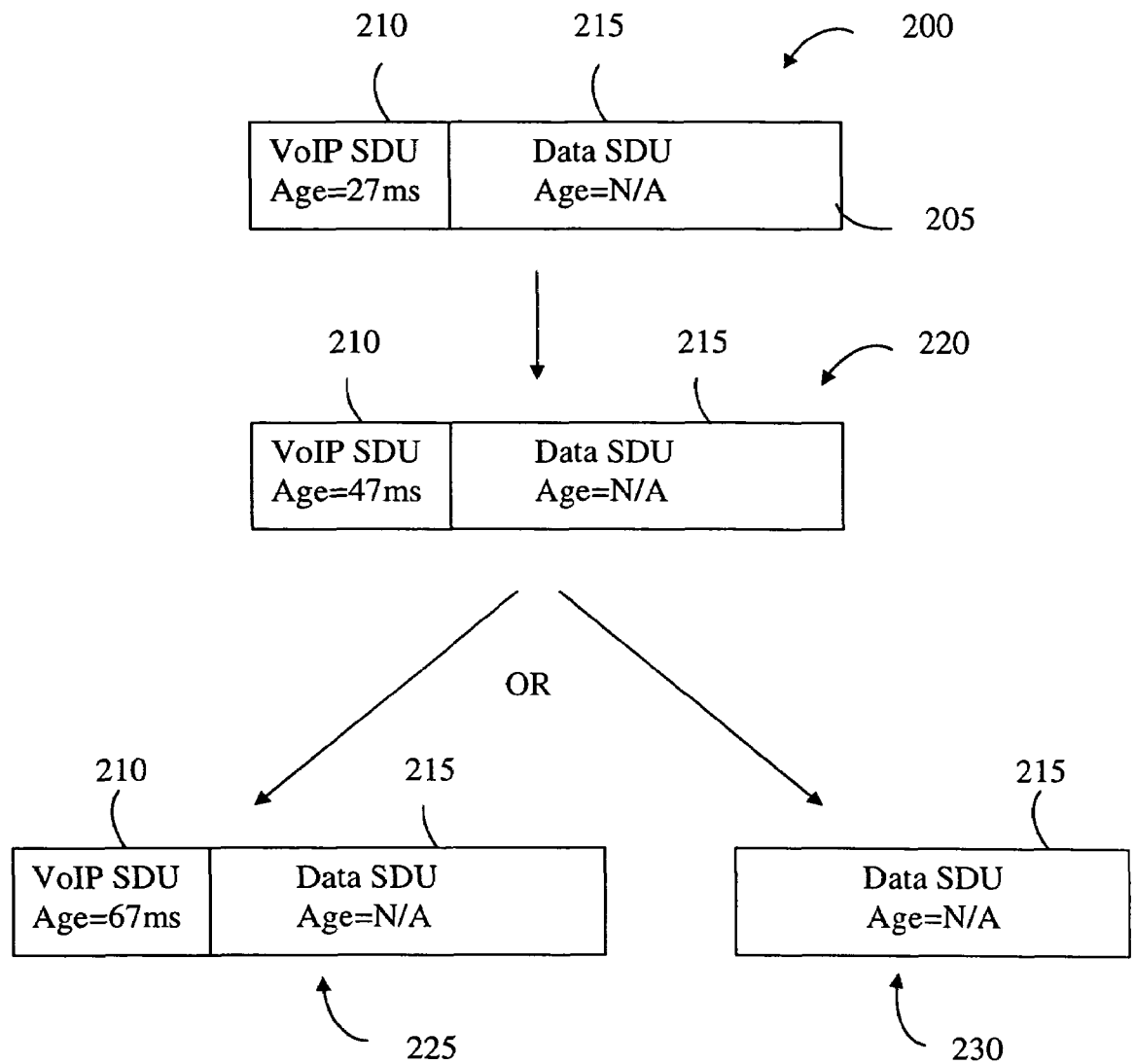
FIG. 2 shows examples of processing data transmissions comprising latency sensitive data and latency tolerant data according to embodiments of the present invention.

Referring to FIG. 2, consider an original transmission 200 comprising data packets 205 transmitted from a transmitter in the form of a wireless communication device, such as wireless communication device 120-1, to a receiver in the form of another wireless communication device, such as wireless communication device 120-2 via the BTS 110-1 shown in FIG. 1. According to some embodiments, the data packets are in the form of Service Data Units (SDUs). Some of the data packets, such as Voice over Internet Protocol (VoIP) SDUs 210, are latency sensitive, which are considered stale if they are not successfully transmitted within a predetermined time and may be discarded. Some of the data packets, such as data SDUs 215, are latency tolerant and can be retransmitted until transmission is successful. Latency tolerant data packets are typically delivered according to a lower Quality of Service (QoS), such as "Best Effort" or "Less than Best Effort" delivery. In the example shown in FIG. 2, the age of the VoIP SDU 210 is only 27 ms and the age of the latency tolerant data SDU 215 is not applicable or relevant.

In the example shown in FIG. 2, the maximum allowed latency for the VoIP SDU 210 is 60 ms, whereas no maximum latency is associated with the data SDU 215. If the receiver 120-2 detects an error in the original transmission, the receiver transmits a Negative Acknowledgement (NACK) to the BTS 110-1. The BTS 110-1 then has the option of either transmitting a copy of the original transmission to take advantage of the combining gain or transmitting a new transmission in which any stale SDUs are omitted. A new transmission results in a smaller transmission, but loses all combining gain because combining gain only works where the copy is the same as the original transmission.

In accordance with embodiments of the present invention, a value $V_r$ of transmitting a copy of the original transmission is defined in Equation 1:

$$V_r = P_N \cdot S_g - S_b \qquad \text{Eqn. 1}$$

where $V_r$ is the value of transmitting a copy of the original transmission measured in terms of units of frame utilization (or "slots" in WiMAX parlance); $P_N$ is a probability that the copy of the original transmission is decoded without an error; $S_g$ is a number of frame utilization units occupied by data that is not stale; and $S_b$ is a number of frame utilization units occupied by stale data.

In accordance with embodiments of the present invention, the value $V_n$ of transmitting a new transmission in which any stale SDUs are omitted is defined in Equation 2:

$$V_n = b \cdot S_g + b \cdot S_b \qquad \text{Eqn. 2}$$

where b is a base probability that the new transmission is decoded without an error in the absence of combining gain; $S_g$ is a number of frame utilization units occupied by data that is not stale; and $S_b$ is a number of frame utilization units not used to transmit stale data and are thus reclaimed for other uses. $S_b$ is also multiplied by b because the reclaimed frame utilization units in the new transmission will also be subject to potential loss.

The value $V_r$ of transmitting a copy of the original transmission and the value $V_n$ of transmitting a new transmission are combined into a single retransmission value function V defined in Equation 3:

$$V = S_g \cdot (P_N - b) - S_b \cdot (1 + b) \qquad \text{Eqn. 3}$$

where $S_g$ is the number of frame utilization units occupied by data that is not stale; $P_N$ is a probability that the copy of the original transmission is decoded without an error; $S_b$ is a number of frame utilization units occupied by stale data; and b is a probability that the new transmission is decoded without an error.

If the retransmission value function V at least equals a predetermined threshold, the combining gain achieved by transmitting the copy of the original transmission outweighs wasted frame utilization units occupied by stale data in the copy of the original transmission. In this embodiment, the predetermined threshold is zero such that if the retransmission value function V evaluates to zero or a positive value, transmission of a copy of the original transmission occurs.

If the retransmission value function V is less than a predetermined threshold, i.e. if the retransmission value function evaluates to a negative value in this embodiment, then the marginal increase in combining gain that would be obtained from transmitting a copy of the original transmission does not outweigh the amount of space that would be wasted by retransmitting stale data. The BTS 110-1 should therefore generate and transmit a new transmission containing only the non-stale data. In other words, the smaller size of the new transmission in which the stale data is omitted compared with the size of the copy of the original transmission outweighs a combining gain that would be achieved by transmitting the copy of the original transmission.

Consider again the scenario in FIG. 2 where an error has been detected in the original transmission 200 and the latency of the latency sensitive VoIP SDU 210 is 27 ms after the original transmission. Transmitting a copy 220 of the original transmission would add a minimum of 20 ms to the latency, such that the latency of the VoIP SDU 210 would be 47 ms. This is less than the maximum latency tolerated by the VoIP SDU 210 such that the VoIP SDU 210 would not be stale at the time of transmission of the copy. The data SDU 215 is tolerant to the latency that would be added by transmitting the copy 220 such that the data SDU 215 would also not be stale. Therefore, the retransmission value function V would exceed the predetermined threshold of zero in this embodiment such that transmission of a copy 220 of the original transmission takes place.

According to other embodiments, where there would be no stale data at the time of transmission of the copy of the original transmission, the retransmission value function V does not need to be evaluated because there would be no wasted frame utilization units occupied by stale data in the copy of the original transmission.

If an error is detected in the copy 220 of the original transmission, in response to receipt of a NACK transmission, transmission of a second copy 225 would add a further 20 ms to the latency of the VoIP SDU 210. The resulting latency of the VoIP SDU 210 would be 67 ms, which exceeds the maximum tolerated latency of 60 ms such that the VoIP SDU 210 would be stale at the time of transmission of the second copy 225. Although the data SDU 215 would not be stale at the time of transmission of the second copy 225, evaluation of the retransmission value function V will determine whether it is more beneficial to transmit a further copy of the original transmission or to transmit a new transmission 230 in which the stale VoIP SDU 210 is discarded. Where the retransmission value function V at least equals the predetermined threshold, which is zero in this embodiment, transmission of a second copy 225 of the original transmission will take place. Where the retransmission value function V is less than the predetermined threshold, a new transmission 230 omitting the stale VoIP SDU 210 will be generated and transmitted.

According to some embodiments of the present invention, a ratio of data from the original transmission that would not be stale when transmitting a copy, or a further copy, of the original transmission, to data that would be stale when transmitting a copy, or a further copy, of the original transmission, is in the range of about 4:1 to about 8:1. The exact ratio depends on the combining gain and the initial transmission success probability $P_N$. Such ratios are typically encountered in systems with mixed latency sensitive traffic and latency tolerant traffic, such as WiMAX.

In some scenarios, the original transmission 200 comprises latency sensitive data, such as a plurality of latency sensitive VoIP SDUs, where at least some of the latency sensitive data has a first latency threshold and at least some of the latency sensitive data has a second latency threshold. Therefore, some of the latency sensitive data will become stale before some of the other latency sensitive data. Evaluating the retransmission value function V to determine whether it at least equals, or is less than a predetermined threshold will determine when it is more beneficial to retransmit one or more copies of the original transmission 200 and when it is more beneficial to generate a new transmission comprising only the non-stale data.

Embodiments of the present invention can be employed in the Medium Access Control (MAC) layer where a Hybrid Automatic Repeat Request (HARQ) retransmission method is employed. However, the present invention can also be employed with other retransmission methods that combine one or more copies of the original transmission with the original transmission to achieve combining gain.

Figure 3:
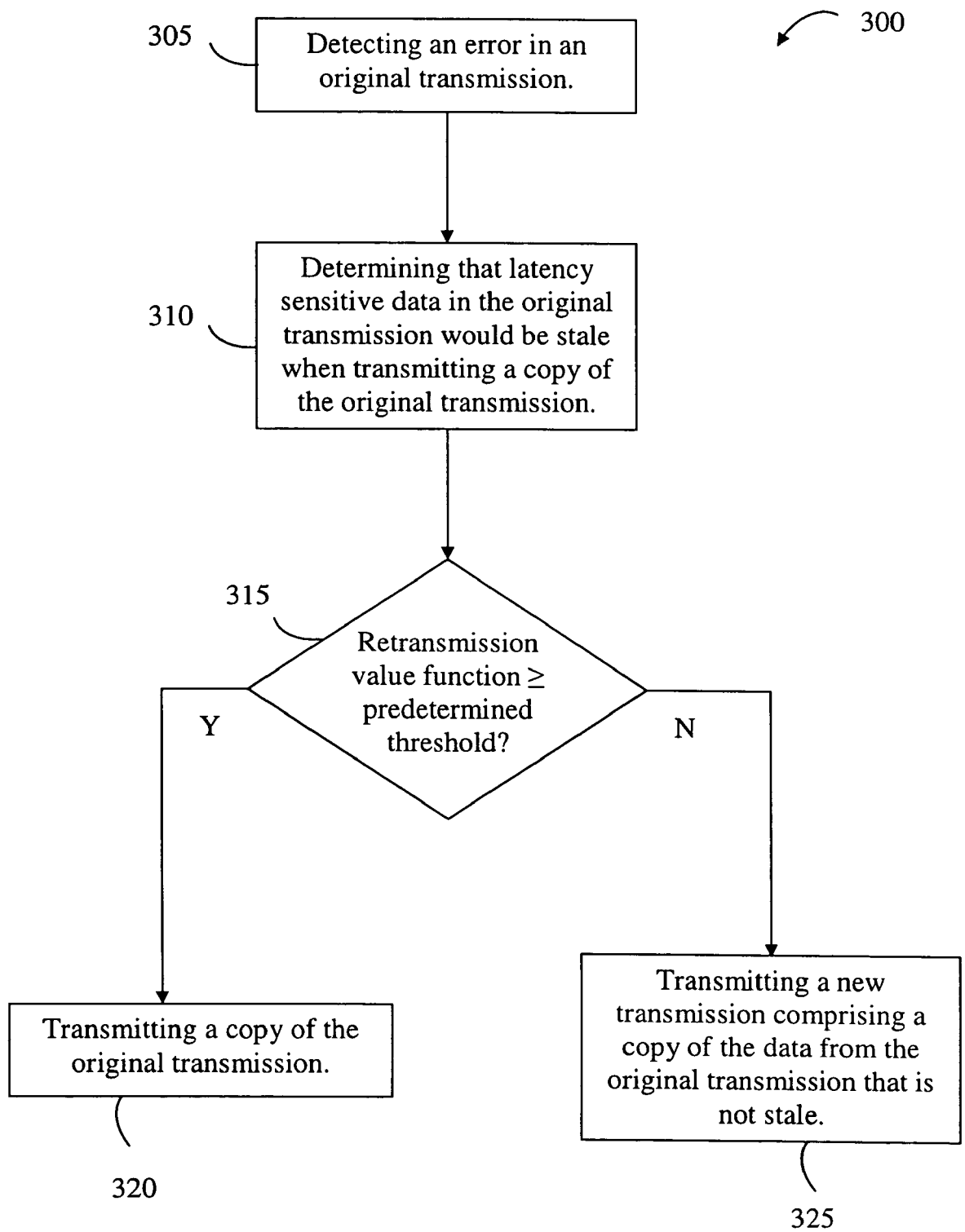
FIG. 3 is a general flow diagram illustrating a method of data transmission in the wireless communication network shown in FIG. 1, according to some embodiments of the present invention.

With reference to FIG. 3, a general flow diagram illustrates a method 300 of data transmission, from the perspective of a transmitter, such as a wireless communication device 120-n, or BTS 110-n, in the wireless communication network 100, according to some embodiments of the present invention. At 305, the method 300 includes detecting an error in the original transmission 200, which is indicated by the receipt of a NACK transmission by the wireless communication device 120-n or BTS 110-n. At 310, in response to detecting the error in the original transmission 200, the method includes determining that latency sensitive data in the original transmission 200 would be stale when transmitting a copy of the original transmission. At 315, the retransmission value function V is evaluated. If the retransmission value function V at least equals the predetermined threshold, the method includes at 320 transmitting the copy 220, 225 of the original transmission. If the retransmission value function V is less than the predetermined threshold, the method includes at 325 transmitting a new transmission 230 comprising a copy of the data from the original transmission that is not stale when transmitting the new transmission.

Figure 4:
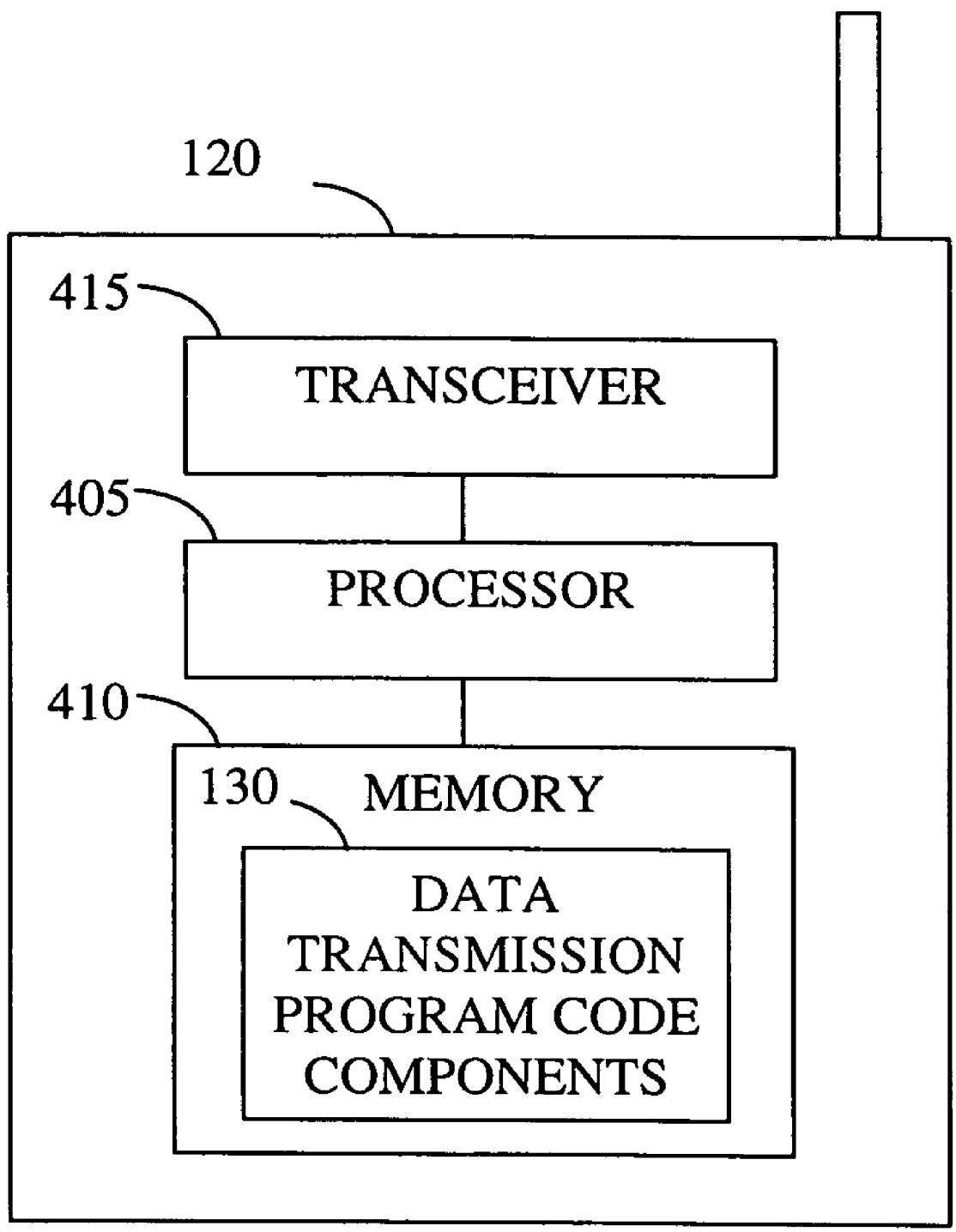
FIG. 4 is a block diagram illustrating components of a wireless communication device of the wireless communication network shown in FIG. 1, according to some embodiments of the present invention.

Referring to FIG. 4, a schematic diagram illustrates components of a wireless communication device 120-n of the wireless communication network 100, according to some embodiments of the present invention. Those skilled in the art will recognize that the present invention can be embodied in a system of such a wireless communication device 120-n, for example, in the form of a mobile telephone, notebook computer, personal digital assistant (PDA), or other wireless communication device and/or in a system of a BTS 110-n. A system of a BTS 110-n or a wireless communication device 120-n can include a processor 405 such as a standard microprocessor or application specific integrated circuit (ASIC) operatively coupled to a storage medium in the form of a memory 410. The memory 410 comprises a computer readable medium such as a random access memory (e.g., static random access memory (SRAM)), read only memory (e.g., programmable read only memory (PROM), or erasable programmable read only memory (EPROM)), or hybrid memory (e.g., FLASH) as is well known in the art. The computer readable medium then comprises the computer readable program code components 130 for data transmission, at least some of which are selectively executed by the processor 405 and are configured to cause the execution of the above described method 300. Communications such as those involved in the method 300 are then transmitted from or received by a transceiver 415 that is operatively coupled to the processor 405.

Advantages of the various embodiments of the present invention thus include improving system performance in wireless communication networks 100 by evaluating the retransmission value function V. The system is optimized because when the retransmission value function V at least equals the predetermined threshold, the combining gain achieved by transmitting a copy 220, 225 of the original transmission 200 outweighs wasted frame utilization units occupied by stale data in the copy of the original transmission. When the retransmission value function V is less than the predetermined threshold, the smaller size of the new transmission 230 that omits stale data compared with the size of the copy 220, 225 of the original transmission 200 outweighs a combining gain that would be achieved by transmitting the copy of the original transmission. Embodiments of the present invention take into consideration combining gain, the age of the data, system utilization and link adaptation to optimize data transmissions.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

What is claimed:

1. A method of data transmission comprising:
   determining, in response to detecting an error in an original transmission in a wireless communication network, that latency sensitive data in the original transmission would be stale when transmitting a copy of the original transmission;
   transmitting the copy of the original transmission when a retransmission value function at least equals a predetermined threshold, the retransmission value function being less than the predetermined threshold when a smaller size of the new transmission compared with a size of the copy of the original transmission outweighs a combining gain that would be achieved by transmitting the copy of the original transmission; and
   transmitting a new transmission when the retransmission value function is less than the predetermined threshold, said new transmission comprising a copy of the data from the original transmission that is not stale when transmitting the new transmission.

2. The method of claim 1, wherein the retransmission value function at least equals the predetermined threshold when a combining gain achieved by transmitting the copy of the original transmission outweighs wasted frame utilization units occupied by stale data in the copy of the original transmission.

3. The method of claim 1, further comprising:
   determining, in response to detecting an error in the copy of the original transmission, that latency sensitive data in the original transmission would be stale when transmitting a further copy of the original transmission.

4. The method of claim 3, further comprising:
   transmitting the farther copy of the original transmission when a retransmission value function at least equals a predetermined threshold; and
   transmitting a new transmission when the retransmission value function is less than the predetermined threshold.

5. The method of claim 1, wherein the retransmission value function V is expressed as follows:

$$V = S_g \cdot (P_N - b) - S_b \cdot (1 + b)$$

where $S_g$ is a number of frame utilization units occupied by data that is not stale;
   $P_N$ is a probability that the copy of the original transmission is decoded without an error; $S_b$ is a number of frame utilization units occupied by stale data; and b is a probability that the new transmission is decoded without an error.

6. The method of claim 1, wherein a ratio of data from the original transmission that would not be stale to data that would be stale when transmitting the copy of the original transmission is in the range of 4:1 to 8:1.

7. The method of claim 1, wherein at least some of said latency sensitive data has a first latency threshold and at least some of said latency sensitive data has a second latency threshold.

8. The method of claim 1, wherein the original transmission is a Hybrid Automatic Repeat Request (HARQ) transmission.

9. The method of claim 1, wherein the method is performed in the Medium Access Control (MAC) layer.

10. A system of data transmission comprising:
    computer readable program code components configured to cause determining, in response to detecting an error in an original transmission in a wireless communication network, that latency sensitive data in the original transmission would be stale when transmitting a copy of the original transmission;
    computer readable program code components configured to cause transmitting the copy of the original transmission when a retransmission value function at least equals a predetermined threshold, the retransmission value function being less than the predetermined threshold when a smaller size of the new transmission compared with a size of the copy of the original transmission outweighs a combining gain that would be achieved by transmitting the copy of the original transmission; and
    computer readable program code components configured to cause transmitting a new transmission when the retransmission value function is less than the predetermined threshold, said new transmission comprising a copy of the data from the original transmission that is not stale when transmitting the new transmission.

11. The system of claim 10, further comprising computer readable program code components configured to cause the retransmission value function to at least equal the predetermined threshold when a combining gain achieved by transmitting the copy of the original transmission outweighs wasted frame utilization units occupied by stale data in the copy of the original transmission.

12. The system of claim 10, further comprising computer readable program code components configured to cause determining, in response to detecting an error in the copy of the original transmission, that latency sensitive data in the original transmission would be stale when transmitting a further copy of the original transmission.

13. The system of claim 12, further comprising:
    computer readable program code components configured to cause transmitting the further copy of the original transmission when a retransmission value function at least equals a predetermined threshold; and
    computer readable program code components configured to cause transmitting a new transmission when the retransmission value function is less than the predetermined threshold.

14. The system of claim 10, further comprising computer readable program code components configured to cause the retransmission value function V to be expressed as follows:

$$V = S_g \cdot (P_N - b) - S_b \cdot (1 + b)$$

where $S_g$ is a number of frame utilization units occupied by data that is not stale;
   $P_N$ is a probability that the copy of the original transmission is decoded without an error; $S_b$ is a number of frame utilization units occupied by stale data; and b is a probability that the new transmission is decoded without an error.

15. A processor for data transmission to:
    determine, in response to detecting an error in an original transmission in a wireless communication network, that latency sensitive data in the original transmission would be stale when transmitting a copy of the original transmission;

transmit the copy of the original transmission when a retransmission value function at least equals a predetermined threshold, the retransmission value function being less than the predetermined threshold when a smaller size of the new transmission compared with a size of the copy of the original transmission outweighs a combining gain that would be achieved by retransmitting the copy of the original transmission; and transmit a new transmission when the retransmission value function is less than the predetermined threshold, said new transmission comprising a copy of the data from the original transmission that is not stale when transmitting the new transmission.

16. The processor of claim 15, wherein the retransmission value function at least equals the predetermined threshold when a combining gain achieved by transmitting the copy of the original transmission outweighs wasted frame utilization units occupied by stale data in the copy of the original transmission.

17. The processor of claim 15, to determine, in response to detecting an error in the copy of the original transmission, that latency sensitive data in the original transmission would be stale when transmitting a further copy of the original transmission.

18. The processor of claim 15, to:

transmit the further copy of the original transmission when a retransmission value function at least equals a predetermined threshold; and transmit a new transmission when the retransmission value function is less than the predetermined threshold.

19. The processor of claim 15, wherein the retransmission value function V is expressed as follows:

$$V = S_g \cdot (P_N - b) - S_b \cdot (1 + b)$$

where $S_g$ is a number of frame utilization units occupied by data that is not stale;

$P_N$ is a probability that the copy of the original transmission is decoded without an error; $S_b$ is a number of frame utilization units occupied by stale data; and b is a probability that the new transmission is decoded without an error.

* * * * *

UNITED STATES PATENT AND TRADEMARK OFFICE
CERTIFICATE OF CORRECTION

| | |
|---|---|
| PATENT NO. | : 7,626,927 B2 |
| APPLICATION NO. | : 11/605033 |
| DATED | : December 1, 2009 |
| INVENTOR(S) | : Putzolu et al. |

Page 1 of 1

It is certified that error appears in the above-identified patent and that said Letters Patent is hereby corrected as shown below:

In column 7, line 48, in Claim 4, delete "farther" and insert -- further --, therefor.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,626,927 B2  Page 1 of 1
APPLICATION NO. : 11/605033
DATED : December 1, 2009
INVENTOR(S) : Putzolu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Twenty-first Day of December, 2010

David J. Kappos
*Director of the United States Patent and Trademark Office*